United States Patent
Ito et al.

(10) Patent No.: US 8,157,888 B2
(45) Date of Patent: Apr. 17, 2012

(54) PROCESS FOR PRODUCING MOLTEN IRON

(75) Inventors: Shuzo Ito, Hyogo (JP); Itsuo Miyahara, Hyogo (JP); Koji Tokuda, Hyogo (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 11/944,753

(22) Filed: Nov. 26, 2007

(65) Prior Publication Data
US 2008/0127778 A1    Jun. 5, 2008

Related U.S. Application Data

(63) Continuation of application No. 10/537,861, filed as application No. PCT/JP03/15509 on Dec. 4, 2003, now abandoned.

(30) Foreign Application Priority Data

Dec. 5, 2002 (JP) ................................. 2002-353525

(51) Int. Cl.
    *C21B 11/08* (2006.01)
(52) U.S. Cl. .................. 75/484; 75/570; 75/571
(58) Field of Classification Search .......... 75/484, 75/570, 571
    See application file for complete search history.

(56) References Cited

U.S. PATENT DOCUMENTS

| | | | |
|---|---|---|---|
| 6,251,156 B1 * | 6/2001 | Hoffman et al. | 75/10.6 |
| 6,582,491 B2 * | 6/2003 | Hoffman et al. | 75/10.63 |
| 6,630,010 B2 * | 10/2003 | Ito et al. | 75/484 |
| 6,648,942 B2 * | 11/2003 | Hoffman et al. | 75/484 |
| 2001/0027701 A1 * | 10/2001 | Ito et al. | 75/484 |
| 2001/0037703 A1 | 11/2001 | Fuji et al. | |
| 2001/0054329 A1 * | 12/2001 | Hoffman et al. | 75/386 |

FOREIGN PATENT DOCUMENTS

| | | |
|---|---|---|
| EP | 0 747 491 | 12/1996 |
| JP | 07-034144 | 2/1995 |
| JP | 2002-146444 | 5/2002 |
| WO | 00/29628 | 5/2000 |

* cited by examiner

*Primary Examiner* — George Wyszomierski
*Assistant Examiner* — Tima M McGuthry Banks
(74) *Attorney, Agent, or Firm* — Oblon, Spivak, McClelland, Maier & Neustadt, L.L.P.

(57) ABSTRACT

A high purity of molten iron is produced efficiently at a higher productivity, by feeding a raw material mixture containing a carbonaceous reducing agent, an iron oxide-containing material and a CaO-containing material onto a hearth of a moving-hearth reducing furnace, heat-reducing the raw material mixture in the reducing furnace, and melting it in a melting furnace melting, wherein a blending amount of the CaO-containing material in the raw material mixture is adjusted in such a manner that another feeding of the CaO-containing material into the melting furnace makes a basicity of a slag generated in the melting furnace 1.1 or more an feeding amount of the CaO-containing material becomes 40 kg or less per ton of the molten iron obtained in the melting furnace.

6 Claims, 4 Drawing Sheets

RAW MATERIAL MIXTURE(2)

CARBONACEOUS MATERIAL(1)

SOLID REDUCED IRON, CARBONACEOUS MATERIAL

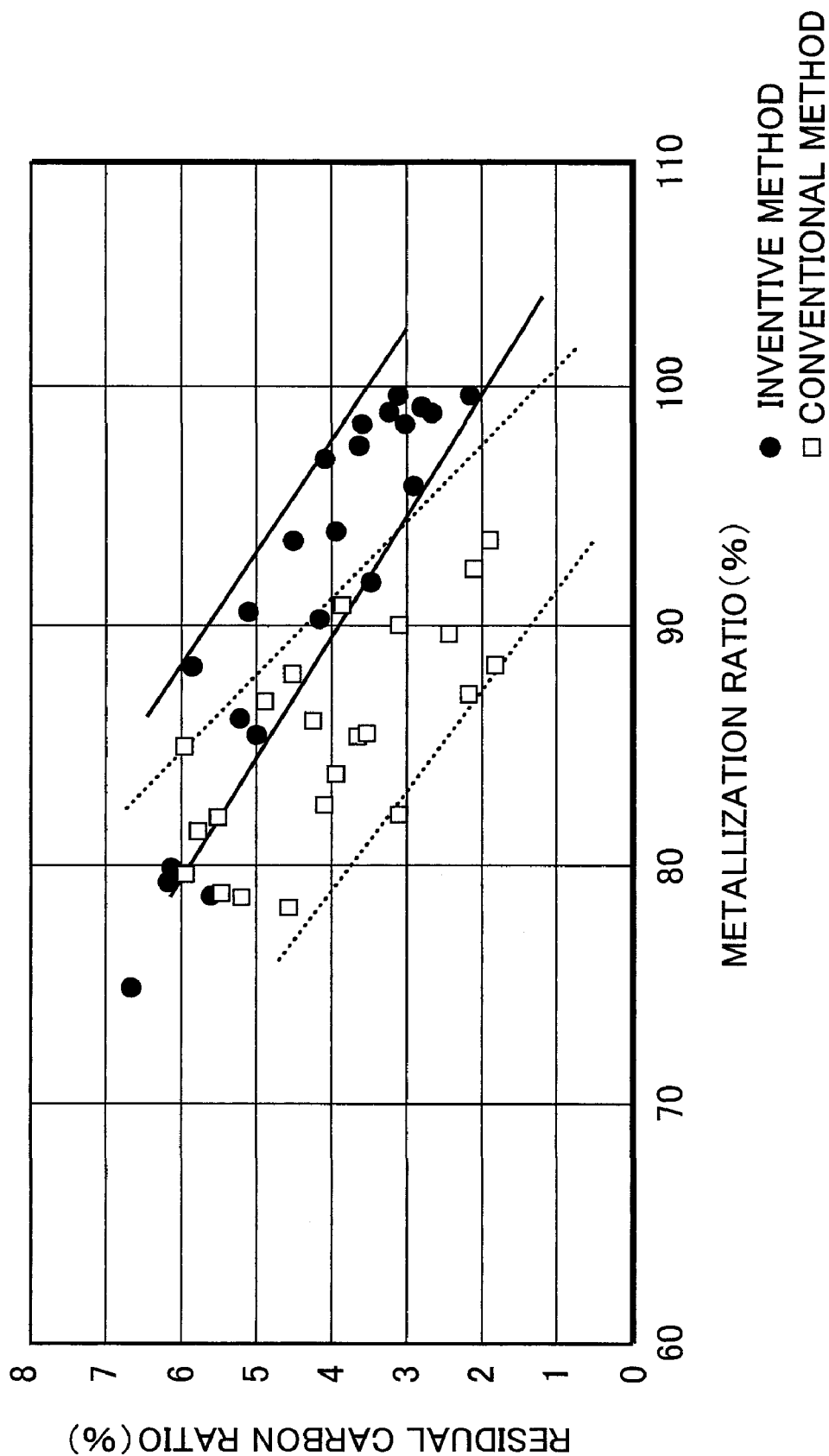

PROCESS FOR PRODUCING MOLTEN IRON

This application is a continuation of Ser. No. 10/537,861 filed Jun. 6, 2006, now abandoned, which is a 371 of PCT/JP03/15509 filed Dec. 4, 2003.

FIELD OF THE INVENTION

The present invention relates to a method of producing a molten iron, more specifically, a method of producing a molten iron by heat-reducing an iron oxide-containing material such as iron ore together with a carbonaceous reducing agent such as carbonaceous material in a moving-hearth reducing furnace and then melting a reduced iron obtained in a melting furnace in particular, which is improved to produce a high purity of molten iron efficiently at a higher productivity.

DESCRIPTION OF THE RELATED ART

As one of the recently developed direct iron making methods, known is a method of producing a molten iron by heat-reducing in a rotary type moving-hearth reducing furnace a mixture containing an iron oxide-containing material (iron source) such as iron ore and a carbonaceous reducing agent such as carbonaceous material, or a compact of the mixture containing carbonaceous material in a shape of pellet, briquette or the like, and then finally reducing and melting the reduced iron obtained in a melting furnace. This method is effective to some extent, because heat of high-temperature exhaust gas generated in the melting furnace can be used efficiently by introducing the heated gas into the moving-hearth reducing furnace, and this enhances a thermal efficiency of the facilities as a whole.

The direct iron making method using a moving-hearth reducing furnace connected to a melting furnace as described above has been studied for a fairly long period, but there are still many problems to be solved for operation in the industrial scale, for example, in operational stability, safety, cost, product quality (purity of molten iron), etc.

The inventors have been engaged in studies on practical application of this kind of direct iron making method, and this time especially studied a method from various aspects aiming at improvement of smooth operations in a series of processes from solid-phase reduction of iron sources by using a moving-hearth reducing furnace such as a rotary hearth furnace to melting in a melting furnace, as well as improvement of the quality of molten iron obtained, further suppression of degradation of processing facilities, in particular refractory, and extension of lifetime of the facilities.

Accordingly, it is an object of the present invention to provide a method that allows a smoother operation in a series of processes from reduction in a moving-hearth reducing furnace to melting in a melting furnace, as well as higher quality of a molten iron obtained, for further suppression of degradation of processing facilities, in particular refractory, and extension of lifetime of the facilities.

SUMMARY OF THE INVENTION

According to an aspect of the present invention which solved the above problems, a method of producing a molten iron having a carbon content of 3.0 mass % or more, comprises: feeding a raw material mixture containing a carbonaceous reducing agent, an iron oxide-containing material and a CaO-containing material onto a hearth of a moving-hearth reducing furnace; heating the raw material mixture in the reducing furnace and thus reducing an iron oxide in the raw material mixture; generating a solid reduced iron having a metallization ratio of 80% or more; feeding the solid reduced iron in the state kept at high temperature into a melting furnace and further heating the solid reduced iron therein; and reducing the partially remaining iron oxide and melting the solid reduced iron; wherein a blending amount of the CaO-containing material in the raw material mixture is adjusted in such a manner that another feeding of the CaO-containing material into the melting furnace makes a basicity of a slag generated in the melting furnace 1.1 or more and that an feeding amount of the CaO-containing material becomes 40 kg or less per ton of the molten iron obtained in the melting furnace.

In practicing the above method, it is preferable to further comprise: feeding a powdery carbonaceous material onto the hearth of the moving-hearth reducing furnace as a hearth material; and then feeding the raw material mixture containing a carbonaceous reducing agent, an iron oxide-containing material and a CaO-containing material onto the hearth material. At the time, it is preferable to make an amount of the carbonaceous material fed as the hearth material 30 kg or more per ton of the molten iron obtained in the melting furnace, for effectively increasing the metallization ratio of the solid reduced iron obtained in the reducing furnace.

It is also preferable to blend the CaO-containing material, whose entire amount is sufficient for making the basicity of the slag generated in the melting furnace 1.1 or more, with the raw material mixture and thus eliminate an amount of the CaO-containing material separately added into the melting furnace in result, for a smoother melting operation in the melting furnace; and it is further preferable to adjust the feeding amount of the carbonaceous material for hearth material in such a manner that an amount of the carbonaceous material of a non-combustion state fed into the melting furnace together with the solid reduced iron discharged from the reducing furnace becomes not less than an amount of the carbonaceous material to be consumed in the melting furnace, for further reliable improvement in the metallization ratio of the solid reduced iron obtained in the reducing furnace, and for a more efficient and faster melting operation in the melting furnace.

It is also preferable to adjust a MgO content in the raw material mixture or to add MgO additionally into the melting furnace in such a manner that the slag generated in the melting furnace has a MgO content of 6 mass % or more, preferably 8 to 13 mass %, for effective suppression of refractory wear in using magnesia bricks as an inner lining refractory for the melting furnace. In this case, it is preferable to adjust a blending amount of CaO- and MgO-containing materials in the raw material mixture in such a manner that an amount of the slag-conditioning agents including CaO and MgO fed additionally into the melting furnace becomes 40 kg or less per ton of the molten iron obtained in the melting furnace.

BRIEF DESCRIPTION OF THE DRAWINGS

FIG. 2 is a graph showing a relationship between a metallization ratio of a solid reduced iron obtained in a rotary-hearth reducing furnace and a residual carbon amount in raw materials in practicing the method according to the present invention and a conventional method.

(A): rotary-hearth reducing furnace, (B): electric melting furnace, (C): iron-bath melting furnace, (1): carbonaceous material (hearth material), (2): raw material mixture (pellet), (3): raw material-feeding hopper, (4): rotary hearth, (5): burner, (6): discharge device, (7): exhaust gas duct, (8): feed chute, (9): electrode, (10): molten slag outlet, (11): molten iron outlet, (12): exhaust gas duct, (13): top blowing lance, (14): bottom-blowing nozzle, (15): side-blowing nozzle, Fe: molten iron, S: molten slag

DESCRIPTION OF THE PREFERRED EMBODIMENTS

As described above, a molten iron is produced continuously by solid-phase reduction of an iron oxide-containing material and melting the reduced material thereof in a series of facilities comprising a moving-hearth reducing furnace and a melting furnace installed next thereto in the present invention. Although it is possible to use a grate-type reducing furnace as a moving-hearth reducing furnace in the present invention, a rotary-hearth reducing furnace is most efficient and practical, considering an area for installation and an operating efficiency of the facility; and thus, embodiments employing a rotary-hearth reducing furnace will be mainly described below. However, the present invention is not limited thereto, and use of any other reducing furnace is possible, if it is a reducing furnace wherein heat-reduction is carried out on its moving hearth.

Figure 1A:
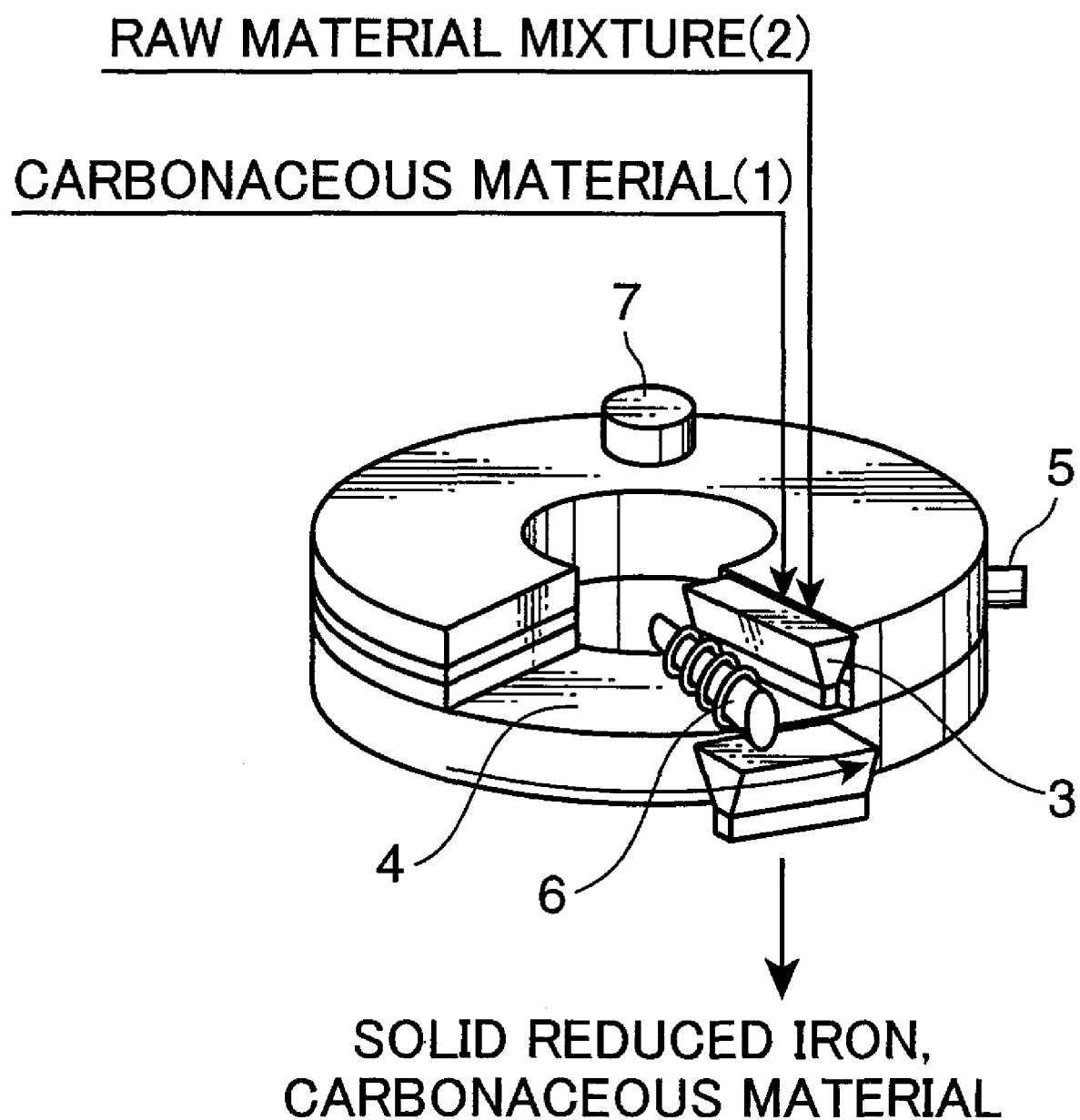
FIG. 1 is a process flow chart showing one embodiment of the present invention.
Figure 1B:
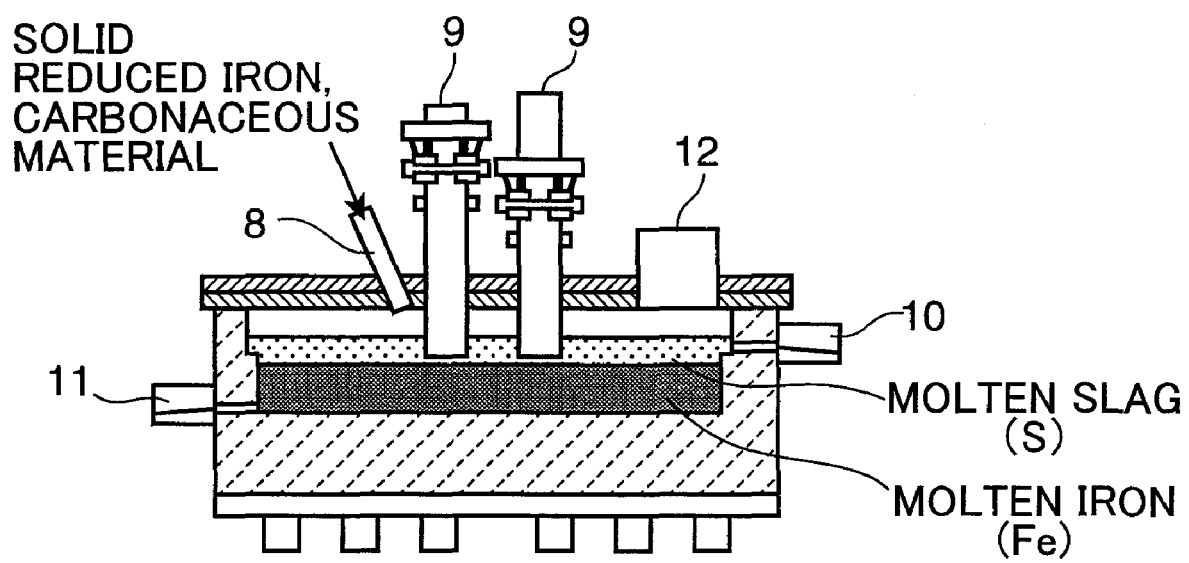
Figure 1C:
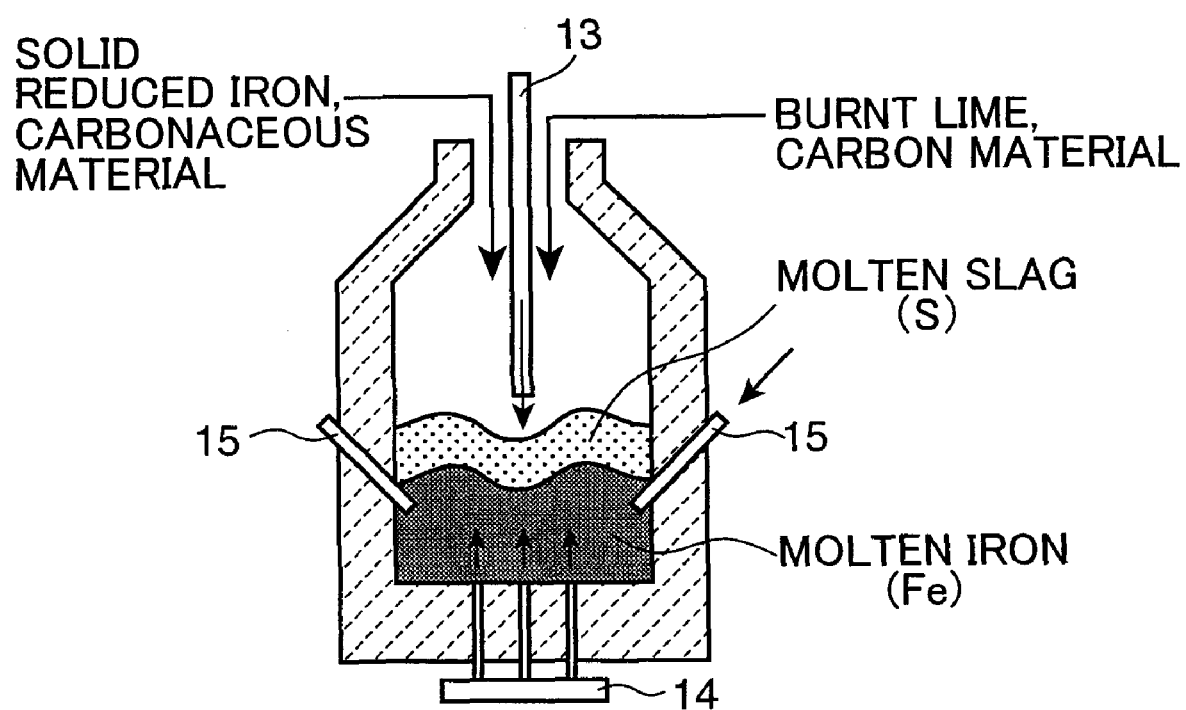

FIG. 1 is a schematic flow chart illustrating a series of facilities used in practicing the present invention, wherein (A); represents a rotary-hearth reducing furnace, (B) an electric melting furnace and (C) an iron-bath melting furnace; and a production method according to the present invention is carried out by using facilities in combination of a rotary-hearth reducing furnace (A) and an electric melting furnace (B), or in combination of a rotary-hearth reducing furnace (A) and an iron-bath melting furnace (C).

A powdery carbonaceous material (1) to be supplied as a hearth material and a raw material mixture (2) which contains an iron oxide-containing material and a carbonaceous reducing agent, further which is added with CaO, MgO, etc. or as needed with a small amount of a binder, (or, a compact or semi-compact formed of these in a shape of pellet and the like as the raw material mixture) are fed preferably continuously onto a rotary hearth (4) of the rotary-hearth reducing furnace (A) via a raw material-feeding hopper (3). More specifically, by installing at least two said raw material-feeding hoppers, prior to feeding the raw material mixture (2), the powdery carbonaceous material (1) is fed onto the rotary hearth (4) from one hopper, and then the raw material mixture (2) is fed from another hopper adjacent to the one. In some cases, the powdery carbonaceous material (1) to be fed as the hearth material may be eliminated.

The rotary hearth (4) of the rotary-hearth reducing furnace (A) shown in the figure rotates counterclockwise, normally in a rotation period of approximately 8 minutes to 16 minutes, although the frequency varies according to operational conditions. A plurality of combustion burners (5) are placed in the sidewall above the rotary hearth (4) and/or in the ceiling in the reducing furnace (A), and heat is supplied to the hearth area from the combustion or radiation heat of the burners (5).

The raw material mixture (2) fed onto the rotary hearth (4) consisted of refractory is heated by combustion or radiation heat of the combustion burners (5) while the mixture moves in a circumferential direction on the hearth (4) in the reducing furnace (A), and an iron oxide in the raw material mixture (2) is reduced to a solid reduced iron while the mixture goes through a heated zone in the reducing furnace (A).

When the heat-reduction is carried out by supplying only the raw material mixture (2) onto the rotary hearth (4), the raw material mixture (2) is less affected by oxidizing gases present in the furnace atmosphere in the earlier stage of heat-reducing the raw material mixture (2), because strongly reducing gases mainly containing CO gas are emitted from the carbonaceous reducing agent blended in the raw material mixture (2) in a great amount to the area surrounding the raw material mixture (2). However, the amount of the reducing gases emitted from inside the raw material mixture (2) decreases in the later stage of reduction, and the raw material mixture (2) becomes affective to the surrounding oxidizing gases (generated by burner combustion, e.g. carbon dioxide, steam, etc.), occasionally leading to re-oxidation of the reduced iron once formed by the heat-reduction and consumption of the carbonaceous reducing agent present inside the raw material mixture (2) by combustion. As a result, it becomes more difficult to control the carbonaceous reducing agent blended as a reducing agent in the raw material mixture (2), sometimes which leads to fluctuation of the metallization ratio of the solid reduced iron obtained.

Therefore, it is preferable to lay the powdery carbonaceous material (1) on the rotary hearth (4) as a hearth material and feed the raw material mixture (2) thereon, because the oxidizing gases such as $CO_2$ generated by burner combustion are reduced again by the carbonaceous material (1) on the hearth (4), even in the later stage of heat-reduction, and thus, it is possible to make an environmental gas surrounding the raw material mixture (2) retain a high level of reduction potential and to produce a solid reduced iron having a desirable metallization ratio more consistently and reliably.

The solid reduced iron produced in the rotary-hearth reducing furnace (A) as described above is discharged by a discharge device (6), together with a slag generated in the heat-reduction process as a byproduct or the carbonaceous material (1) used as a hearth material remaining after combustion. In the figure, (7) represents an exhaust gas duct.

In any case, the solid reduced iron generated in the reducing furnace (A) is discharged in a state kept at high temperature possibly without cooling by the discharge device (6) out of the furnace, together with the carbonaceous material (1) remaining on the hearth (4), and fed into the melting furnace placed directly connected or close to the rotary-hearth reducing furnace (A). In the figure, (B) represents an electric melting furnace and (C) an iron-bath melting furnace, and one of these melting furnaces is used suitably selected as needed.

When the electric melting furnace (B) is used, the solid reduced iron and the residual carbonaceous material at high temperature discharged from the reducing furnace (A) are fed into the furnace through a feed chute (8) placed at the top part of the furnace. An auxiliary material (slag-conditioning agent) containing CaO or MgO, if supplied, is fed via a chute identical with or different from the chute for the solid reduced iron into the melting furnace (B). In the electric melting furnace (B), heat is supplied into the furnace from electrodes (9), and unreduced iron oxide remaining in the solid reduced iron is reduced and the solid reduced iron is melted by the heat, finally a molten slag (S) and a molten iron (Fe) are separated and accumulated in the furnace. Then, these molten iron (Fe) and molten slag (S) are discharged at a suitable timing respectively via a molten slag outlet (10) and a molten iron outlet (11) out of the furnace. In the figure, (12) represents an exhaust gas duct.

On the other hand, when the iron-bath melting furnace (C) is used, the solid reduced iron and the carbonaceous material are fed into the furnace from the upper part of the melting furnace (C). An oxygen-containing gas for combustion of the carbonaceous material in the furnace is generally blown at high speed downward onto the slag (S) or the molten iron (Fe) by a top-blowing lance (13) inserted from the top part of the furnace. Alternatively, the oxygen-containing gas may be blown into the furnace from a bottom-blowing nozzle (14) placed in the furnace bottom, from a side-blowing nozzle (15) placed in the furnace wall, or from these two or more lance and nozzles in a suitable combination.

In use of this kind of melting furnace, it is necessary to supply a certain amount of needed heat into the furnace by combusting a carbonaceous material in the furnace, and thus a certain amount of fuel is needed; and if no hearth material is fed or if only using an unburned carbonaceous material (hearth material) fed from the reducing furnace (A) to the melting furnace involves scarcity of fuel, the carbonaceous material in short supply may be added alone or in combination with other auxiliary materials (CaO, MgO and the like) from the top part of the furnace.

In the present invention, in producing a molten iron by feeding the solid reduced iron obtained in the rotary-hearth reducing furnace into the melting furnace placed next thereto continuously or batchwise and then finally reducing and melting the unreduced iron oxide (FeO) remaining in the solid reduced iron in the facilities described above, it is quite important to control a content of a slag former in such a manner that the slag generated in the melting furnace as a byproduct has a basicity ($CaO/SiO_2$) of 1.1 or more, preferably 1.3 or more, for production of a molten iron having a low-sulfur-content (low [S]).

It is for the purpose of lowering an S content in the molten iron ([S]) by transferring the sulfur content in the molten iron, [S], toward the slag. If a raw material mixture made of coal, coke or the like as a carbonaceous reducing agent (generally, a raw material compact formed of the mixture in a shape of pellet, aggregate, etc., or a semi-compact lightly pressed and formed of the mixture) is used, the solid reduced iron obtained by heat-reducing the raw material mixture contains a great amount of sulfur derived from the coal or coke; or if a coal-based powder is used for a hearth material, the solid reduced iron also contains a great amount of sulfur; therefore, use of these carbon sources as a reducing component results in containment of a significant amount of sulfur in the solid reduced iron.

When the solid reduced iron is melted in the melting furnace, the sulfur is distributed between molten iron (Fe) and molten slag (S) generated in the melting furnace. Results of the studies by the inventors showed that the partition ratio, {S content in slag (mass %)/S content in molten iron (mass %): (S)/[S]}, becomes higher as the slag basicity increases, and thus it is preferable to feed a CaO source additionally into the melting furnace in such a manner that the basicity of the slag generated becomes 1.1 or more, preferably 1.3 or more.

In addition, the above partition ratio, (S)/[S], is significantly dependent on an iron oxide (FeO) content in slag and there is a tendency that the partition ratio decreases drastically as the iron oxide content increases. Accordingly, even when the basicity of slag is adjusted, for example, to 1.3 or more, the S partition ratio toward slag side decreases drastically as the iron oxide (FeO) content in the slag increases, consequently making it difficult to lower the content of sulfur in molten iron.

After studies on the (FeO) content in slag needed for increasing the above partition ratio, (S)/[S], and lowering the sulfur content in molten iron, it has been found that the content may be suppressed about 5 mass % or less and preferably 2 mass % or less. After further studies on the practical requirement for reducing the (FeO) content in slag to 5 mass % or less, preferably 2 mass % or less, it has been also confirmed that it is possible to adjust the (FeO) content in slag to about 2 mass % or less reliably and consequently raise the S partition ratio toward slag and lower [S] in the molten iron efficiently by increasing [C] content in the molten iron to 3.0 mass % or more.

From the confirmation results above, the basicity of the slag generated in the melting furnace is adjusted to 1.1 or more, more preferably 1.3 or more, and the [C] content in the molten iron obtained to 3.0 mass % or more in the present invention.

As described above, the amount of CaO component contained as a gangue component of iron oxide sources (iron ore and others) in the raw material mixture is not sufficient, and an additional amount of CaO component to cover shortfall should be added separately into the melting furnace for adjusting the basicity of the slag generated in the melting furnace to 1.1 or more. For promoting the smooth melting of CaO having a high melting point in the melting furnace, it is necessary to maintain the melting furnace at a suitable temperature and agitate a byproduct slag efficiently. However, for example in an electric melting furnace, it is difficult to maintain a sufficiently high melting rate of CaO having a high-melting point, which is likely to occur aggregation and coagulation into a block shape before the slag component fully melting and consequently to leads to drastic delay of melting as well as to inhibit a melting of the solid reduced iron.

MgO-based refractory is commonly used as an inner lining refractory of the melting furnace, which is exposed to the slag having a higher basicity; and it is desirable to add an MgO-containing material separately into the melting furnace such as dolomite, preferably to a MgO content in the slag generated of 6 mass % or more, preferably 8 to 13 mass %, for increasing the MgO content relatively in the generated slag during melting of the solid reduced iron and prevention of the wearing damage of the MgO-based refractory, but in such a case, supply of MgO, which has a high-melting point, directly into the melting furnace may cause similar problems caused by supply of CaO.

On the other hand, the content or the composition of the gangues (slag composition) contained in an iron oxide-containing raw material vary significantly according to grade or properties of an iron source contained in a raw material mixture (iron ore, etc.), and the amount of the slag finally generated in the melting furnace is normally approximately 80 to 300 kg per ton of molten iron although it varies slightly depending on the desired basicity, and reaches a level of 400 kg per ton of molten iron when an iron oxide-containing material lower in iron purity is used as a raw material.

In this manner, the amount of the slag generated in the melting furnace varies significantly depending on a grade or kind of iron sources (iron oxide-containing material) used as the raw material, and thus, the amount of a CaO-containing material (burnt lime, etc.) to be added into a melting furnace for controlling the slag basicity, for example, in the range of 20 to 150 kg per ton of molten iron.

Thus, for adjusting the basicity of the slag generated in the melting furnace reliably to 1.1 or more, or for further preventing the wearing damage of the inner lining refractory, it is necessary to add solid reduced iron together with a great amount of slag-conditioning material (CaO, MgO, etc.) into the melting furnace, making the wearing inhibition described above (delay of melting of the slag conditioning materials and the solid reduced iron) a non-negligible issue.

Focusing on the problems above, the inventors have conducted studies on the effects of the amount of a slag-conditioning agent added together with the solid reduced iron into the melting furnace on the melting inhibition described above and the measures to overcome the effects, and found the followings; said melting inhibition becomes more significant, resulting in the significant adverse effects on the operation of the furnace when the amount of a slag-conditioning agent added together with the solid reduced iron into the melting furnace exceeds 40 kg per ton of molten iron; the amount of a slag-conditioning agent such as CaO (or CaO and MgO) added into the melting furnace at the time should be reduced to 40 kg per ton of molten iron or less for prevention thereof; a slag-conditioning agent component needed in excess should be blended previously into a raw material mixture to be fed into a rotary-hearth reducing furnace as raw material; and in this manner, it is possible to accelerate the melting of the solid reduced iron and the slag-conditioning agent in the melting furnace.

Accordingly, when a slag composition contained in a iron oxide source or others in a raw material mixture have a low basicity and a CaO-containing material to compensate the shortage should be added additionally in a melting furnace, the present invention employs the method of alleviating the abovementioned melting inhibition drastically: by mixing all or most part of the additional one to the raw material mixture in advance; then by sintering or partially melting these slag compositions in the raw material mixture by using the heat for heat-reduction of the iron oxide in the rotary-hearth reducing furnace (A) and changing it into a low melting-point complex oxide; and thus by increasing the melting rate (slagging rate) of the slag conditioning materials fed together with the solid reduced iron into the melting furnace and the slag-generating rate drastically.

More specifically, when the amount of the slag-conditioning agent (CaO- or MgO-containing material) to be added into the melting furnace is more than 40 kg per ton of molten iron, the method accelerates the melting of the slag in the melting furnace and also the melting of the solid reduced iron: by mixing the excess amount thereof with the raw material mixture to be fed into the rotary-hearth reducing furnace (A) in advance; then by sintering or partially melting the slag compositions in the raw material mixture (containing the added CaO- or MgO-containing material) at the same time during heat-reduction of the iron oxide in the raw material mixture; and thus by changing it into complex oxides such as $CaO-SiO_2$, $2CaO-SiO_2$, $3CaO-2SiO_2$, $2CaO-Al_2O_3-SiO_2$, $3CaO-2SiO_2$, $CaO-MgO-SiO_2$, $3CaO-MgO-2SiO_2$, and the like.

Although the melting point of burnt lime (CaO) per se is 2,572° C., when the CaO-containing material is mixed in advance into the raw material mixture and heat-reduced at a temperature in the range of 1,250 to 1,400° C., these form the complex oxides as described above by sintering or partially melting together with the other slag components in the raw material mixture. These complex oxides have melting points significantly lower than that of CaO itself, and melt rapidly when fed subsequently into a melting furnace. Among general complex oxides, the melting point of $CaO-SiO_2$ is 1,544° C.; that of $CaO-MgO-SiO_2$, 1,610° C.; that of $3CaO-MgO-2SiO_2$, 1,575° C.; that of $2CaO-SiO_2$, 2,130° C.; that of $CaO-Al_2O_3-2SiO_2$, 1,550° C.; and that of $Al_2O_3-SiO_2$, 1,810° C., although these melting points may vary according to the raw material and the blending ratio used, and all of these melting points are notably lower than that of CaO itself.

As a result, even when the amount of the slag finally generated exceeds, for example, 300 kg per ton of molten iron, it becomes possible to perform a melting operation smoothly and reliably in a melting furnace without the melting inhibition of the slag former described above.

Of course, when the total amount of the slag-conditioning agent additionally added (CaO- or MgO-containing material) is less than 40 kg per ton of molten iron, the operation by previously blending the total amount of the slag-conditioning agents with the raw material mixture and adding no slag-conditioning agents such as CaO or MgO into the melting furnace is also a favorable embodiment of the present invention, and this method is particularly effective when an electric furnace, which demands a greater amount of electric power for heating, is used as a melting furnace.

At that time, it is preferable to feed the solid reduced iron discharged from the rotary-hearth reducing furnace (A) in a state kept at a higher temperature as possible, preferably 900° C. or more, into the melting furnace for suppressing the heat energy needed additionally in the melting furnace to the minimum.

In practicing the present invention, the metallization ratio of the solid reduced iron produced by heat-reduction in the rotary-hearth reducing furnace is preferably controlled to 80% or more, preferably 85% or more, and still more preferably 90% or more. When the metallization ratio is lower than that, the amount of the unreduced iron oxide (FeO) remaining in the solid reduced iron generated by heat-reduction becomes larger, and when the solid reduced iron is fed into the melting furnace, a greater amount of CO gas is generated due to reduction of the residual iron oxide, resulting in drastic slag foaming. In addition, a part of iron oxide is mixed into the generated slag without reduction, increasing the FeO content of the slag, lowering the S partition ratio between slag and metal (molten iron), thus disturbing the decrease of the S content of the molten iron as described above and drastically accelerating the wearing damage of the inner lining refractory of the melting furnace. Therefore, the solid reduced iron generated by heat-reduction in the rotary-hearth reducing furnace (A) preferably has a metallization ratio of 80% or more, more preferably 85% or more, and still more preferably 90% or more.

According to the present invention, in a series of processes which includes: producing a solid reduced iron by heat-reduction in a rotary-hearth reducing furnace; feeding and heating the solid reduced iron obtained subsequently in the melting furnace directly connected or placed close to the reducing furnace; and thus reducing the residual unreduced iron oxide and melting the reduced iron generated into a molten iron, it becomes possible to perform the series of processes from the production of a solid reduced iron to the heat melting of the reduced iron efficiently, by developing solid-phase reduction of the iron source (iron oxide) intensively as possible in the rotary-hearth reducing furnace (A) and focusing on melting the solid reduced iron in the melting furnace. Besides, according to the present invention, it is also possible to reduce the S content of the molten iron and suppress the wearing damage of the inner lining refractory of melting furnace to the minimum, by adjusting to a suitable basicity of the slag.

In addition in the present invention, during heat-reduction of a raw material mixture in the rotary-hearth reducing furnace, by laying a carbonaceous material such as pulverized coal onto the hearth of the reducing furnace as a hearth material layer prior to feeding the raw material mixture, and then by feeding the raw material mixture over the hearth material, it advantageously becomes possible to produce a reduced iron having a desirable metallization ratio [percentage of a metal iron weight generated by reduction of iron oxide to the total amount of iron contained in the iron source (iron oxide) blended in the raw material mixture] reliably with a very small fluctuation of the metallization ratio, specifically of 5 mass % or less, further 2 mass % or less, within a rotation of the hearth of rotary-hearth reducing furnace. Therefore, it is preferable.

The heat needed for heat-reduction in the rotary-hearth reducing furnace is supplied to the raw material mixture on the rotary hearth by burner heating. As described above, the reduced iron once formed may be re-oxidized by oxidizing gases such as $CO_2$ gas generated by burner combustion, also, the reduction ratio will be difficult to increase when the reduction potential above the hearth [generally represented by $(CO+H_2)/(CO+CO_2+H_2+H_2O) \times 100(\%)$ or more simply represented by $CO/(CO+H_2O) \times 100(\%)$] decreases in the last stage of reduction; but it becomes possible to keep the reduction potential of the environmental gas surrounding the raw material mixture high even in the last stage of reduction by laying a powdery carbonaceous material on the hearth as a hearth material, because the atmosphere of the furnace, especially the $CO_2$ gas diffused into the atmosphere surrounding the raw material mixture on the hearth as a hearth material is changed once again to CO gas having reducing power by the carbonaceous material present. As a result, it becomes possible to ensure a high level of metallization ratio of 80% or more, 85% or more, and further 90% or more, and to reduce the fluctuation in metallization ratio to the minimum.

Because said carbonaceous material fed onto the hearth as a hearth material is consumed in the reaction with the environmental gases (in particular, $CO_2$ gas) as described above, it is desirable to estimate the consumption amount of the carbonaceous material in preliminary experiments and to feed the carbonaceous material in an amount at least ensuring the consumption amount or more. The consumption amount of the carbonaceous material varies according to the scale, properties, operational condition and others of the rotary-hearth reducing furnace used, but the amount is approximately 20 to 30 kg per ton (dry base) of raw material mixture fed into the rotary-hearth reducing furnace, or approximately 30 to 60 kg per ton of molten iron obtained in the melting furnace by heat-melting, according to the estimation based on many experiments by the inventors.

About 30 kg per ton of molten iron of carbonaceous material fed onto the rotary hearth of the reducing furnace as a hearth material is mostly consumed for improvement of the atmosphere in the reducing furnace (A), and the hearth material in an smaller amount than this has an insufficient atmosphere-improving effect (reduction potential-retaining effect), prohibiting the desirable metallization ratio and possibly widening the fluctuation in the metallization ratio.

Therefore, in practicing the present invention, for maintaining the reduction potential of the atmosphere surrounding the raw material mixture on the hearth at a high level, namely, for secure prevention of re-oxidation of the reduced iron once formed, even in the last stage of reduction in the rotary-hearth reducing furnace, the amount of the powdery carbonaceous material fed as the hearth material is preferably at least 30 kg or more, more preferably 50 kg or more, and still more preferably 100 kg or more per ton of molten iron obtained in the melting furnace.

In the preferred embodiment of the present invention wherein a powdery carbonaceous material is laid as a hearth material on the rotary hearth as described above, it is effective to form a hearth material layer having a certain thickness for elongating a lifetime of the hearth refractory, because the hearth material layer becomes a buffer between the raw material mixture and the hearth refractory or a protective material of the hearth refractory against a byproduct slag, etc. In addition, when fed into the melting furnace in the next process together with the solid reduced iron, the excessive amount of carbonaceous material discharged without combustion in the rotary-hearth reducing furnace (A) becomes a highly active high-temperature carbonaceous material eliminated volatile components by heating. Thus, the method is also advantageous in smoother operation of the melting furnace from this viewpoint. In particular, when the iron-bath melting furnace (C), that is, a melting furnace having no heating means by electrodes and using the combustion heat of carbonaceous material as heat source, is used, it is preferable to supply 100 kg or more per ton of molten iron of carbonaceous material previously into the rotary-hearth reducing furnace, because 200 kg or more of carbonaceous material per ton of molten iron is needed for heating and melting in the melting furnace.

However, care should be given to the amount of the carbonaceous material, because the excessive amount of carbonaceous material laid on the hearth of the reducing furnace leads to an excessively thick hearth material layer (carbonaceous material in an amount of 200 kg or more results in a layer thickness of about 5 mm or more), and, for example, a layer thickness of more than about 7.5 mm leads to penetration of the raw material mixture into the hearth material layer on the hearth, causing problems such as inhibition of the progress of reduction. According to an estimation based on experiments by the inventors, 100 kg of powdery carbonaceous material per ton of molten iron is normally equivalent to a thickness of 2.5 mm, although the thickness depends on the loading density of the raw material mixture laid thereon.

The kind of the carbonaceous material to be laid on the hearth of the rotary-hearth reducing furnace is not particularly limited; general coal, coke, etc., which is pulverized into particles, preferably which has a suitable diameter, may be used. When coal is used, anthracite, which is less fluid and which is less swelling or viscous on the hearth, is favorable.

In practicing the present invention, a molten iron having a carbon content, [C], of 3.0 mass % or more is produced by: feeding a solid reduced iron with a high metallization ratio in a rotary-hearth reducing furnace without cooling in a state kept at a temperature as high as possible, preferably at 900° C. or more, into the melting furnace; reducing the iron oxide remaining in the raw material mixture and melting the solid reduced iron rapidly; and separating a molten iron and a molten slag.

In addition, in practically applying the method of the present invention, it is preferable to add a carbonaceous material into the rotary-hearth reducing furnace in an amount slightly larger than an amount finally needed, by previously estimating the amount of the additional carbonaceous material needed in the melting furnace, and by taking into consideration an amount of the carbonaceous material consumed at the previous stage for improvement of the reduction potential of the atmospheric gas in the rotary-hearth reducing furnace and a carbon amount remaining in the solid reduced iron after reduction of the carbonaceous reducing agent blended in the raw material mixture.

Of course, the amount of carbonaceous material needed in the melting furnace differ significantly between when an arc-heating electric furnace (B) is used as the melting furnace and when heating is performed by using the combustion heat of carbonaceous material as in the iron-bath melting furnace (C). However in any case of the present invention, it is possible to produce a solid reduced iron having a stabilized quality of a fluctuation in metallization ratio of 5% or less, by previously estimating the amount of carbonaceous material needed in the rotary-hearth reducing furnace and the melting furnace; then in the former process by laying 30 kg or more of carbonaceous material per ton of final molten iron on the hearth of the rotary-hearth reducing furnace; and by performing heat-reduction of the raw material mixture on the carbonaceous material layer. By feeding the solid reduced iron obtained and the carbonaceous material remaining on the hearth in a state kept at a temperature as high as possible into the melting furnace, it becomes possible to conduct a series of operations from solid-phase reduction to melting smoothly and efficiently.

In practicing the inventive method, in the series of treatments using the rotary-hearth reducing furnace and the melting furnace, it is preferable to estimate the amount of the carbonaceous material consumed or needed in all processes and allocate the carbonaceous material suitably into these processes according to the amount and the role of the carbonaceous material needed in each process for more efficient utilization of the carbonaceous material (carbonaceous reducing agent).

The amount of the carbonaceous material consumed in all processes is preferably controlled as grossly classified into the followings. One is a carbonaceous material (a) which is blended with a raw material mixture (or its compact, etc.) as a carbonaceous reducing agent, an amount of the carbonaceous material (a) is the amount of the carbon consumed if the raw material mixture is completely reduced; this carbon amount varies according to the operational condition of rotary-hearth reducing furnace, in particular its atmospheric gas composition. Another is a carbonaceous material (b) which is fed onto the moving hearth as a hearth material; this amount of the carbon, which converts oxidizing gases, such as $CO_2$ generated by burner combustion in the reducing furnace, back into CO gas by reduction ($CO_2+C=2CO$) in the neighborhood of the hearth, prevents re-oxidation of the solid reduced iron generated over the rotary hearth, and thus enables production of a solid reduced iron having a high metallization ratio and a low fluctuation in the metallization ratio, and is critical for stabilized melting operation of the solid reduced iron and the slag component in a melting furnace.

Still others are a carbonaceous material (c) ensuring the recarburization (carburization) needed for melting a solid reduced iron in a melting furnace and producing a molten iron having a desired carbon content, and a carbonaceous material (d) consumed as a fuel of the melting furnace when an iron-bath melting furnace using the combustion heat of carbonaceous material for heating therein is used. Thus, the carbonaceous material (d) is unnecessary when an arc-heating electric furnace is used, and such a system is controlled based on three kinds of carbonaceous materials (a), (b) and (c).

The carbonaceous material (a) used as a carbonaceous reducing agent in a raw material mixture, which is blended in an amount for efficient promotion of reduction of the iron oxide in the raw material mixture, is preferably blended in an amount up to that needed for production of a molten iron having a desired carbon content in the melting furnace in general. In this way, it is not necessary to add an additional carbonaceous material into the melting furnace and it is possible to concentrate only on the melting of the solid reduced iron. In such a case, the amount equivalent to the carbonaceous material (b) consumed in the rotary-hearth reducing furnace is fed into the furnace, but in either case, the carbonaceous material is allocated suitably so that the total amount of the carbonaceous materials (a) and (b) becomes constant.

Alternatively, when a furnace that combusts carbonaceous material with oxygen gas separately supplied thereinto and that uses the combustion heat for melting the solid reduced iron is used as the melting furnace, the carbonaceous material consumed for combustion in the melting furnace should be added additionally, compared with a case when an arc-heating melting furnace is used; and thus, when coke, for example, is used as the carbonaceous material, the carbonaceous material in an amount of about 250 kg per ton of the molten iron finally obtained or more should be added into the melting furnace, although the amount varies to some extent according to the operational condition.

Accordingly in practicing the method of the present invention, recommended is an operation by blending an amount of carbonaceous material needed for carburization for ensuring a carbon content of final molten iron, in principle, previously with a raw material mixture and laying about 130 to 230 kg/ton (molten iron) of the carbonaceous material on the hearth of the reducing furnace. In this case, approximately 50 to 150 kg/ton (molten iron) of additional carbonaceous material should be added into the melting furnace.

When an arc-heating electric melting furnace (B) is used as the melting furnace, it is necessary to adjust the amount of the carbonaceous reducing agent in the raw material mixture fed onto the rotary-hearth reducing furnace as the raw material to a slightly smaller value, for controlling the carbon content of the molten iron finally obtained to less than 3.0 mass %, resulting in widening the fluctuation in carbon consumption amount or the like in the reducing furnace, and thus it becomes difficult to produce a solid reduced iron having a metallization ratio of 80% or more, preferably 85%, and more preferably 90% or more in the reducing furnace consistently and reliably. Further, the carbon content in the molten iron finally obtained becomes also unstable, and thus, the lower limit value of the amount of the carbonaceous material fed into the reducing furnace as a hearth material is also restricted significantly.

On the contrary, when an excessive amount of carbonaceous material is fed onto a hearth of a moving-hearth reducing furnace so that the carbon content of final molten iron becomes 3.0 mass % or more, the carbon content of the molten iron increases gradually up to the saturated C content, but when it exceeds the saturated C content, the excessive amount of carbon is discharged out of the melting furnace together with the slag and the like without being dissolved into the molten iron in the melting furnace, when the molten iron and slag are discharged from the melting furnace. Thus, it is wasteful economically to supply the carbonaceous material into the reducing furnace in an amount exceeding the saturated C content of the molten iron.

EXAMPLES

Hereinafter, the present invention will be described in more detail with reference to examples and comparative examples, but it should be understood that the present invention is not restricted by the following examples and various modifications are possible in the scope of the present description above and below and included in the scope of the present invention.

Example 1

In this experiment, as shown in the following Tables 1 and 2, two kinds of iron ores as iron oxide sources and one kind of coal as a carbonaceous reducing agent were used, and operational conditions were compared between when burnt lime (CaO) was added previously to the raw material mixture (here, that is a compact in a pellet shape) to be fed into a rotary-hearth reducing furnace so that the slag formed in a melting furnace had a basicity of 1.6 respectively and when burnt lime was not added.

TABLE 1

Major compositions and contents of iron ore (mass %)

| Iron ore | Total Fe | SiO$_2$ | Al$_2$O$_3$ | CaO | MgO | S | P |
|---|---|---|---|---|---|---|---|
| Ore (A) | 68.01 | 1.08 | 0.47 | 0.03 | 0.06 | 0.002 | 0.041 |
| Ore (B) | 68.67 | 3.83 | 0.19 | 0.38 | 0.40 | 0.002 | 0.024 |

TABLE 2

Composition of reducing agent (mass %)

| Reducing agent | FC | VM | TA | Total |
|---|---|---|---|---|
| Coal | 71.5 | 19.9 | 8.6 | 100 |

(Notes)
FC: Fixed Carbon,
VM: Volatile Matter,
TA: Total Ash

Raw material compacts (pellets) having the composition shown in Table 3 were formed by using the two kinds of iron ores and one kind of carbonaceous material shown in Tables 1 and 2. As described in FIG. 1, each pellet was first subjected to solid-phase reduction in a rotary-hearth reducing furnace aiming at producing a solid reduced iron at a metallization ratio of 92%, and the resulting solid reduced iron was fed without particular cooling into an arc-heating electric furnace located close thereto for production of a carbon-saturated molten iron ([C]: 4.6 mass %) approximately at 1,525° C. Operational results are summarized in Table 4. The binder used was wheat flour.

TABLE 3

Raw material pellet formulations

| | | Blending amount (mass %) | | | |
|---|---|---|---|---|---|
| Classification | Ore | Ore | Coal | Binder | Limestone |
| (1) | Ore (A) | 77.4 | 21.1 | 1.5 | 0.0 |
| (2) | Ore (A) | 74.4 | 20.4 | 1.5 | 3.7 |
| (3) | Ore (B) | 78.8 | 19.7 | 1.5 | 0.0 |
| (4) | Ore (B) | 75.6 | 18.9 | 1.5 | 4.0 |
| (5) | Ore (B) | 72.4 | 18.1 | 1.5 | 8.0 |

TABLE 4

Summary of experimental results

| | Iron ore (A) | | Iron ore (B) | | |
|---|---|---|---|---|---|
| Classification | Method (1) | Method (2) | Method (3) | Method (4) | Method (5) |
| 1) Main and auxiliary materials | | | | | |
| Reduced iron (dry) (kg/t(mi)) | 1137 | 1132 | 1156 | 1170 | 1217 |
| Hearth-fed carbon material (kg/t(mi)) | — | 54.5 | — | 61.9 | 62.1 |
| Carbon material(added) (kg/t(mi)) | 24.1 | — | 21.0 | — | — |
| Burnt lime (kg/t(mi)) | 44.9 | — | 96.7 | 54.1 | — |
| Dolomite (kg/t(mi)) | — | — | — | — | — |
| 2) Utility | | | | | |
| Electric power (kWh/t(mi)) | 507 | 408 | 489 | 437 | 408 |
| Oxygen (Nm$^3$/t(mi)) | — | — | — | — | — |
| 3) Molten iron | | | | | |
| [C] (mass %) | 4.2 | 4.5 | 4.3 | 4.6 | 4.6 |
| Molten iron temperature (° C.) | 1475 | 1525 | 1505 | 1510 | 1525 |
| 4) Slag | | | | | |
| Slag consumption (kg/t(mi)) | 86.6 | 90.9 | 184 | 180.1 | 179.4 |

As apparent from Table 4, in the method (1) using the iron ore (A), being continuously fed approximately 1,137 kg per ton of molten iron [represented by kg/t(mi) in the table] of the solid reduced iron obtained in the rotary-hearth reducing furnace into the electric arc melting furnace under a high-temperature condition (about 900° C.), approximately 44.9 kg per ton of molten iron of burnt lime (CaO) and approximately 24.1 kg per ton of molten iron of a carbonaceous material (here, that is coke) were fed at the same time into the melting furnace, for production of a carbon-saturated molten iron desirably having a [C] content of 4.6 mass %.

The iron ore used in this experiment was a high-grade ore containing a small amount of gangue components, but if the targeted basicity of slag generated in the melting furnace is set to 1.6, the amount of burnt lime to be added additionally to the melting furnace became approximately 44.9 kg per ton of molten iron, which is a slight beyond the range specified in the present invention. As a result, a phenomenon that a part of the slag aggregates in a block shape was observed when burnt lime was added to the melting furnace in the melting process, leading to instability of the operation for melting burnt lime and reduced iron and to elongation of the period needed for complete melting.

In addition, the carbonaceous material amount needed for heating in the melting furnace was supplied not onto the rotary hearth of the rotary-hearth reducing furnace on an upstream side but directly into the melting furnace, and thus, the reduction potential of hearth atmosphere declined to some extent at the last stage of reduction in the rotary-hearth reducing furnace. Consequently, the solid reduced iron discharged from the reducing furnace has a relatively low metallization ratio in the range of 78% to 88% and has a larger fluctuation therein (average: 84%), and thus the molten iron finally obtained has a relatively lower carbon content of 4.2 mass %. The molten iron temperature also dropped to 1,475° C., lower by approximately 50° C. than the desired value, and the operation period was also elongated.

The theoretical value for the amount of carbonaceous material to be added additionally into the melting furnace is 18.5 kg per ton of molten iron in this case, but 24.1 kg per ton of molten iron of carbonaceous material, greater by approximately 30% than the theoretical value, was added to the melting furnace as fuel, because the operational condition of the melting furnace was slightly unstable.

Alternatively in the method (2) using the ore (A) as iron oxide source, CaO in a total amount needed for adjusting the basicity of the slag generated in the melting furnace to 1.6 (45 kg per ton of molten iron) was previously added to the raw material mixture (pellet); a solid reduced iron having a metallization ratio of approximately 92% was obtained by feeding the pellet into the rotary-hearth reducing furnace; and the solid reduced iron was fed together with approximately 17 kg per ton of molten iron of the carbonaceous material remaining on the hearth into the next melting furnace, to give a molten iron having a carbon content of approximately 4.5 mass %, Approximately 54.5 kg per ton of molten iron of pulverized coal was fed onto the hearth of the reducing furnace as a hearth material, and approximately 17 kg per ton of molten iron thereof was discharged from the reducing furnace in an unburned state and fed into the melting furnace.

The combustion ratio of the carbonaceous material in the rotary-hearth reducing furnace depends on the operational condition of the reducing furnace, and was approximately 69% in this experiment. In the method (2), the solid reduced iron obtained in the reducing furnace had an almost desirable metallization ratio of 92% and an extremely low fluctuation thereof of ±1.5%. Further, it was possible to melt the slag and the solid reduced iron quite smoothly in the melting furnace even without addition of a slag-conditioning agent (burnt lime), demonstrating the advantageous features of the present invention. In addition, the [C] value of the molten iron finally obtained in this example was almost desirable 4.5 mass %, and it was also possible to control the molten iron temperature after treatment almost accurately to a desired value.

After sampling the solid reduced iron from the reducing furnace and separation of the slag from the solid reduced iron, mineral components in the slag were determined by X-ray analysis. The results showed presence of mineral components such as $2CaO-SiO_2$, $3CaO-MgO-2SiO_2$, $3CaO-2SiO_2$ and $2CaO-Al_2O_3-SiO_2$, demonstrating generation of the complex oxides superior in solubility intended by the present invention. The results also showed that the S content of the molten slag collected from the melting furnace was approximately 1.5 mass % and the [S] content of the molten iron approximately 0.04 mass %, indicating that most of sulfur is transferred to the slag.

The ore (B) contains a great amount of silicon oxide ($SiO_2$) in the gangue components as shown in Table 1, and when this kind of ore is used, it is necessary to add CaO in an amount greater than that to the ore (A) for generation of a slag having a desirable basicity in the melting furnace, and the slag consumption generated in the melting furnace reaches approximately 180 kg per ton of molten iron. In the method (3), wherein the raw material compact (pellet) prepared by a carbonaceous reducing agent and a small amount of a binder with blending the ore (B) was fed alone without addition of a pulverized coal as a hearth material onto the rotary hearth and subjected to heat-reduction, it was possible to achieve a metallization ratio of approximately 88%, but the fluctuation thereof was slightly larger at ±3.5%.

In any case, when melting was carried out by continuously supplying the solid reduced iron obtained in the rotary-hearth reducing furnace, a carbonaceous material and a slag-conditioning agent (burnt lime) into the melting furnace, it was necessary in the method (3) to add a greater amount (96.7 kg per ton of molten iron) of burnt lime (CaO) for controlling the basicity of the slag generated in the melting furnace to 1.6, resulting in unsmooth progress of the melting of the burnt lime fed into the melting furnace, frequent generations of aggregates (blocks) over the slag during melting, making it more difficult to continue operation, and consequently, occurring frequent interruptions of operation.

While in the method (4), about a half of the burnt lime needed for adjustment of the slag basicity in the melting furnace is blended with the raw material pellet previously, and another half thereof was added to the melting furnace. In this experiment, all carbonaceous material needed for the melting furnace (approximately 61.9 kg per ton of molten iron) was fed as a hearth material onto the hearth of the rotary-hearth reducing furnace on an upstream side, a part of the carbonaceous hearth material is consumed in the reducing furnace, and the amount of the residual carbonaceous material discharged from the reducing furnace was approximately 17.5 kg per ton of molten iron.

In this case, the amount of a slag-conditioning agent (burnt lime) to be added into the melting furnace is approximately 54 kg per ton of molten iron, which is beyond the range specified in the present invention. Consequently, a phenomenon that the slag became partially aggregated in the melting furnace was observed, although serious troubles leading to interruption of the process for melting solid reduced iron did not occur. Thus, the amount of the slag-conditioning agent added additionally to the melting furnace seems to be approximately 40 kg per ton of molten iron or less.

On the contrary, in the method (5), the entire CaO source to be added for controlling the slag basicity in the melting furnace was blended previously with the raw material pellet, and no CaO source was added into the melting furnace. In this experiment, all of the carbonaceous material needed in the entire process was added in advance into the reducing furnace as a hearth material. A part of the carbonaceous material fed as a hearth material was consumed for preservation of the reduction potential in the reducing furnace, but another part, approximately 18 kg per ton of molten iron, thereof was fed into the melting furnace together with the solid reduced iron.

The solid reduced iron discharged from the rotary-hearth reducing furnace had a very high metallization ratio of 92% close to the desired value and a very small fluctuation thereof of ±1.0%; and melting of the byproduct slag and the solid reduced iron in the melting furnace proceeded rapidly in a more stabilized manner, allowing stabilized operation even though the slag consumption was higher at about 180 kg per ton of molten iron.

Example 2

In this example, used was an iron-bath melting furnace that uses the combustion heat of carbonaceous material as a heat source for melting a solid reduced iron. A furnace similar to oxygen top-blowing converter was used as the melting furnace, and oxygen for combustion of the carbonaceous material in the melting furnace was blown onto the molten iron from above by using a top-blowing lance. Specifically, conducted were two experiments: by a conventional method of adding into the melting furnace a CaO-containing material needed for controlling the slag basicity not being blended with a raw material compact; and by the present inventive method of blending all of the CaO-containing material with the raw material compact, where each method uses the same ore (A) as that used in Example 1 as an iron oxide source. Results are summarized in Table 5.

In the conventional method (1), the amount of CaO needed for adjusting the basicity of the slag generated in the melting furnace to 1.6 was relatively smaller at about 73 kg per ton of molten iron, because a high-quality iron ore containing a smaller amount of $SiO_2$ in gangue components was used as an iron oxide source; the amount, which is larger than 40 kg per ton of molten iron i.e., the upper limit of the addition amount of the slag-conditioning agent specified in the present invention, was added to the melting furnace; and no powdery carbonaceous material was added onto the hearth of the rotary-hearth reducing furnace for production of solid reduced iron.

Different from the melting method of using an electric furnace as a melting furnace, the method allowed relatively smoother melting of the burnt lime added into the melting furnace, because it is possible to agitate the molten iron and the slag vigorously by the oxygen blown from the top-blowing lance. The metallization ratio of the solid reduced iron obtained after heat-reduction was significantly higher at an average of 90%, but the fluctuation thereof was extremely larger at ±4.5%; thus, the molten iron temperature fluctuated significantly in the range of 1,400 to 1,560° C. during melting; and it was difficult to control the molten iron temperature to the desired value of 1,525° C.

Then, 275 kg per ton of molten iron of carbonaceous material was supplied additionally into the melting furnace, based on an estimation of the amount of the carbonaceous material needed in the entire process, but the carbon content of the molten iron, [C], finally obtained was 3.8 mass %, significantly lower than the desired value of 4.5 mass %.

Alternatively in the method (2) according to the present invention, a raw material pellet having a composition identical with that of the used in Example 1 was prepared, and the pellet and approximately 210 kg per ton of molten iron of a carbonaceous material were fed onto the hearth of the rotary-hearth reducing furnace as a hearth material for heat-reduction. Approximately 30 kg per ton of molten iron of the carbonaceous material supplied onto the hearth of the reducing furnace is consumed by combustion for preservation of the reduction potential in the reducing furnace, and the other, approximately 180 kg per ton of molten iron, of the carbonaceous material was supplied together with the solid reduced iron into the melting furnace. Thus, the insufficient amount, 74 kg per ton of molten iron, of the carbonaceous material was added additionally to the melting furnace. All burnt lime needed to adjust the basicity of the slag generated in the melting furnace to a desired value (1.6) was blended with the raw material pellet in advance, and no burnt lime was added to the melting furnace.

In the method (2) according to the present invention, a solid reduced iron at approximately 900° C. was fed into the melting furnace in a similar manner to the conventional method (1); because the fluctuation of the metallization ratio of the solid reduced iron was very small at 90 to 93%, the solid reduced iron melted very smoothly in the melting furnace, giving a molten iron having a carbon content, [C], of 4.7 mass % (almost identical with the desired value of 4.6 mass %) at a molten iron temperature of 1,530° C. (desired value: 1,525° C.); the [S] content thereof is sufficiently low at 0.028 mass %, and the fluctuation in molten iron temperature was also very small at 1,500 to 1,550° C.

TABLE 5

Summary of experimental results

| | Iron ore (A) | |
|---|---|---|
| Classification | Conventional method (1) | Inventive method (2) |
| 1) Main and auxiliary materials | | |
| Reduced iron (dry) (kg/t(mi)) | 1090 | 1155 |
| Hearth-fed carbon material (kg/t(mi)) | | 210 |
| Carbon material(added) (kg/t(mi)) | 275 | 74 |
| Burnt lime (kg/t(mi)) | 73 | |
| Dolomite (kg/t(mi)) | | |
| 2) Utility | | |
| Electric power (kWh/t(mi)) | | |
| Oxygen ($Nm^3$/t(mi)) | 224 | 209 |
| 3) Molten iron | | |
| [C] (mass %) | 3.8 | 4.7 |
| Molten iron temperature (° C.) | 1500 | 1530 |
| 4) Slag | | |
| Slag consumption (kg/t(mi)) | 137 | 133 |

Example 3

In this example, shown is a typical method of producing a solid reduced iron smaller in fluctuation and higher in metallization ratio by using a rotary-hearth reducing furnace. Namely, one case that the heat-reduction carried out by feeding 30 kg or more of a powdery carbonaceous material (per ton of molten iron obtained in the next melting furnace) onto the rotary hearth of a rotary-hearth reducing furnace as a hearth material and then by feeding the raw material pellet over the carbonaceous hearth material layer; and another case that the heat-reduction carried out by feeding only the raw material pellet directly onto the hearth without laying the powdery carbonaceous material onto the rotary-hearth; were compared. In either case, the residual carbon amount of the pellet and the metallization ratio were determined by collecting the raw material pellet under reduction from the sampling holes placed at different sites of the furnace, while maintaining the atmospheric temperature in the reducing furnace to a constant temperature of 1,340° C.

As shown in FIG. 2, when there was no carbonaceous material layer on the hearth, the fluctuation in the residual carbon amount was relatively larger even at the same metallization ratio, and it was difficult to produce a solid reduced iron having a high metallization ratio of 90% or more consistently. On the other hand, as apparent from FIG. 2, when heat-reduction is carried out after feeding the carbonaceous hearth material over the rotary hearth and feeding the raw material pellet over there, the fluctuations in metallization ratio and in residual carbon amount became very small and a high metallization ratio was obtained; and comparison between these cases reveals that supply of the carbonaceous material as a hearth material is extremely effective.

Accordingly, in practicing the present invention, that is, in producing a reduced iron having a metallization ratio of 80% or more by using a rotary-hearth reducing furnace, in particular, by employing a method of feeding first the carbonaceous hearth material on the hearth and then feeding the raw material pellet thereon, it becomes possible to reduce the fluctuation in the amount of carbon remaining in the solid reduced iron obtained after heat-reduction (i.e., residual carbon amount) into the range of ±1.0 mass %, and to assure a consistent and reliable operation in melting the solid reduced iron in the next melting furnace. In contrast, when compared at the same metallization ratio, the fluctuation in residual carbon amount when the carbonaceous material is not fed as a hearth material became ±1.0 mass % or more, indicating that the operation in the melting furnace is rather instabilized.

In the present invention, the reason for setting the metallization ratio of the solid reduced iron to 80% or more is that when the metallization ratio of solid reduced iron is less than 80%, the load for reducing the residual FeO in solid reduced iron in the melting furnace becomes greater and vigorous foaming of the slag caused by the CO gas bubbles generated during the reduction of the residual FeO makes the operation more unstable. Thus, the scope of the present invention is determined.

In producing a molten iron by heat-reducing a raw material mixture containing an iron oxide source and a carbonaceous reducing agent and then heat melting the reduced mixture in facilities in a combination of a moving-hearth reducing furnace such as rotary-hearth reducing furnace and a melting furnace, the present invention described so far in detail allows smoother melting of the slag and the solid reduced iron in the melting furnace in a shorter period of time, in particular, by adjusting the addition amount of the CaO-containing material in such a manner that the basicity of the slag generated in the melting furnace becomes 1.1 or more and adjusting the amount of the CaO-containing material fed into the melting furnace to 40 kg per ton of molten iron or less, adding the balance of the CaO-containing material to the raw material mixture, or preferably adding the total amount of the CaO-containing material to the raw material mixture and eliminating the CaO-containing material added into the melting furnace.

In addition, it is possible to keep the reduction potential consistently at a high level at the last stage of reduction in the reducing furnace and raise the metallization ratio of the solid reduced iron by employing the method of feeding a powdery carbonaceous material onto the moving-hearth reducing furnace as a hearth material preferably in advance to a raw material mixture; and in particular, it is possible to perform a series of operations from solid-phase reduction to heat melting more smoothly by performing operation by using the carbonaceous material as the hearth material in an amount of 30 kg or more per ton of molten iron, more preferably by feeding the total amount of the carbonaceous material needed in the entire process as the hearth material.

In addition according to the present invention, it is possible to raise the carbon content of the molten iron obtained in the melting furnace to 3.0 or more easily because of the increase in the metallization ratio of the solid reduced iron obtained in the reducing furnace and the increase in the amount of the carbonaceous material used as a hearth material. As a result, the present invention provides various advantages in industrial application, such as decrease in the iron oxide content of the molten slag generated in melting furnace, control of the wearing damage of the inner lining refractory of melting furnace, increase in the partition ratio of sulfur toward slag, drastic decrease in the sulfur content of molten iron, and others.

What is claimed is:

1. A method of producing molten iron containing carbon of 3.0 mass % or more, the method comprising:
feeding powdery carbonaceous material onto a hearth of a moving-hearth reducing furnace as hearth material;
feeding raw material mixture containing carbonaceous reducing agent, iron oxide-containing material and first CaO-containing material onto the hearth material;
heating the raw material mixture in the reducing furnace and thus reducing iron oxide in the raw material mixture and forming low melting-point complex oxide from the first CaO-containing material;
generating solid reduced iron having metallization ratio of 80% or more;
feeding the solid reduced iron in the state kept at high temperature, the low melting-point complex oxide and second CaO-containing material into a melting furnace and further heating the solid reduced iron therein; and
reducing iron oxide partially remaining in the solid reduced iron and melting the solid reduced iron; wherein
the sum of the amount of the first CaO-containing material blended in the raw material mixture and the amount of the second CaO-containing material fed into the melting furnace is adjusted such that basicity of slag generated in the melting furnace is 1.1 or more, and
the amount of the second CaO-containing material fed into the melting furnace is reduced to 40 kg or less per ton of molten iron obtained in the melting furnace, and CaO-containing material needed in excess is blended previously into the raw material mixture as the first CaO-containing material, when the sum of the amount of the first CaO-containing material and the amount of the second CaO-containing material for satisfying the basicity is over 40 kg per ton of the molten iron.

2. The method of producing molten iron according to claim 1, wherein
the amount of the powdery carbonaceous material fed onto the hearth of the moving-hearth reducing furnace is 30 kg or more per ton of the molten iron obtained in the melting furnace.

3. The method of producing molten iron according to claim 2, wherein the amount of the powdery carbonaceous material fed onto the hearth of the moving-hearth reducing furnace is adjusted such that the amount of carbonaceous material of non-combustion state fed into the melting furnace together with the solid reduced iron discharged from the reducing furnace is equal or larger than the amount of carbonaceous material to be consumed in the melting furnace.

4. The method of producing molten iron according to claim 3, wherein both MgO content in the raw material mixture and the amount of MgO-containing material fed into the melting furnace are adjusted such that MgO content of slag generated in the melting furnace is 6 mass % or more.

5. The method of producing molten iron according to claim 2, wherein both MgO content in the raw material mixture and the amount of MgO-containing material fed into the melting furnace are adjusted such that MgO content of slag generated in the melting furnace is 6 mass % or more.

6. The method of producing molten iron according to claim 1, wherein both MgO content in the raw material mixture and the amount of MgO-containing material fed into the melting furnace are adjusted such that MgO content of slag generated in the melting furnace is 6 mass % or more.

* * * * *